United States Patent [19]
Powell et al.

[11] 3,987,988
[45] Oct. 26, 1976

[54] GROUND SPEED CALCULATION FOR DIGITAL DME

[75] Inventors: Ronald Lee Powell, King of Prussia; Frank Patterson Smith, 2nd, Dresher, both of Pa.

[73] Assignee: Narco Scientific Industries, Inc., Fort Washington, Pa.

[22] Filed: Apr. 28, 1975

[21] Appl. No.: 571,845

[52] U.S. Cl. ............................ 244/182; 235/150.2; 235/151.32; 317/5; 324/160; 340/62
[51] Int. Cl.² ........................................ G05D 1/08
[58] Field of Search ............. 73/178 R, 178 T, 488, 73/489, 500, 517; 235/150.2, 150.22, 150.26, 150.27, 151.32; 244/77 D, 182; 303/21; 307/232, 262; 317/5; 324/160; 328/155; 329/122; 340/62, 263; 343/8, 112 S

[56] References Cited
UNITED STATES PATENTS

| | | |
|---|---|---|
| 3,181,150 | 4/1965 | Ruppersberg ............................ 343/8 |
| 3,308,387 | 3/1967 | Hackett ............................... 328/155 |
| 3,337,814 | 8/1967 | Brase et al. ...................... 328/155 X |
| 3,649,818 | 3/1972 | Sylvander et al. ........... 235/150.2 X |
| 3,800,125 | 3/1974 | Cleary, Jr. ........................ 235/150.2 |
| 3,838,889 | 10/1974 | Miller ................................. 303/21 P |

Primary Examiner—Stephen G. Kunin
Attorney, Agent, or Firm—Paul & Paul

[57] ABSTRACT

A voltage controlled oscillator provides a pulse signal which, when frequency scaled, is representative of aircraft velocity. Pulses representative of passage of the aircraft over distance intervals are coupled to one input of a comparator-integrator, and the VCO output pulses are further divided and coupled to the other input terminal of the comparator-integrator. The integration voltage controls the VCO. The VCO signal is frequency scaled and fed to a counter, the output count of which is strobed periodically and decoded to yield velocity.

11 Claims, 1 Drawing Figure

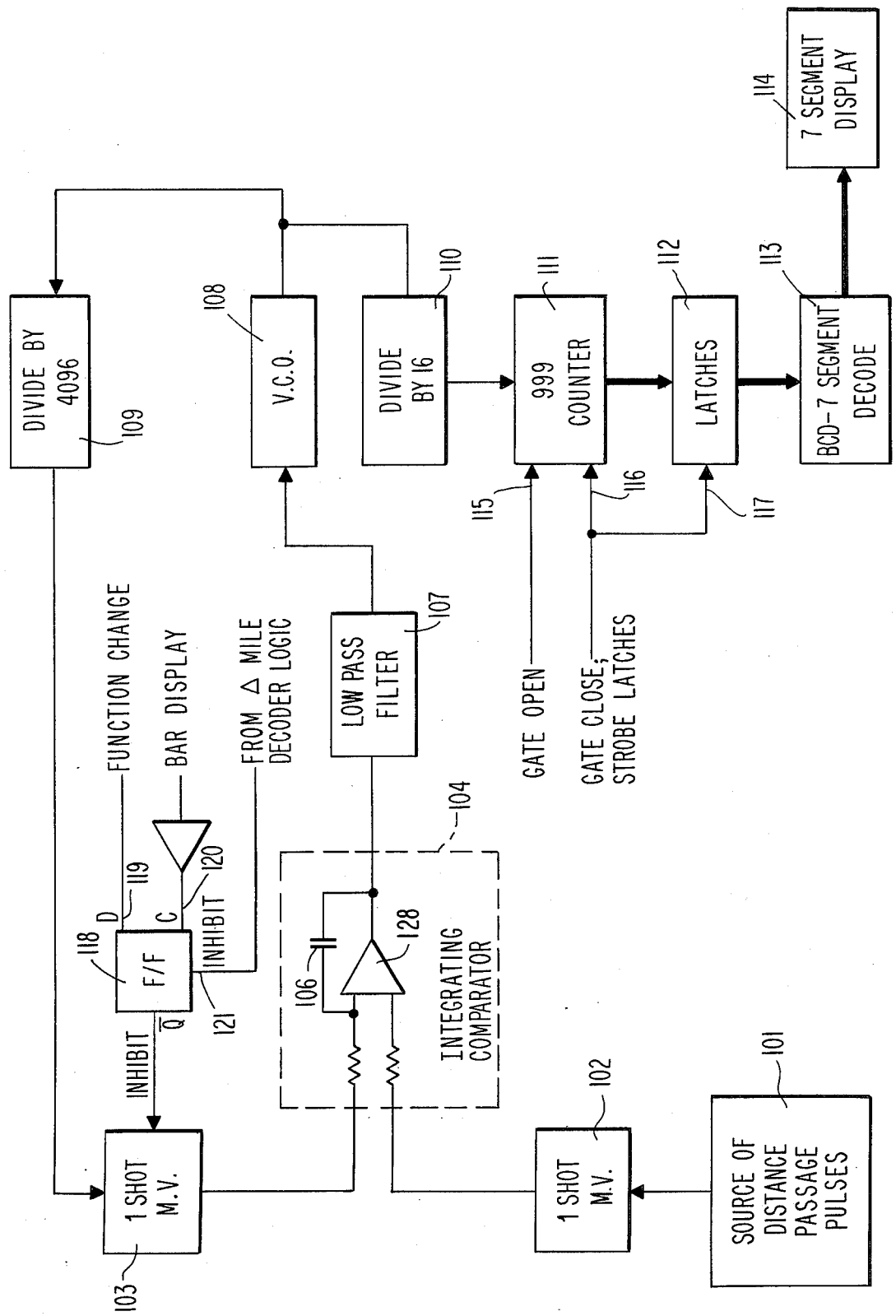

GROUND SPEED CALCULATION FOR DIGITAL DME

BACKGROUND OF THE INVENTION

This invention relates to aircraft distance measuring equipment (DME), and more particularly to improvements in digital DME systems.

Conventionally, DME operation involves the transmission of a radio signal of specified character from an aircraft to a ground station. After specified delays and under known constraints at the ground station, a reply signal is radioed back to the aircraft. Once the return signal is identified, and known time delays are accounted for, the duration between transmission and reception is decoded to yield distance from the ground station to the aircraft.

It is a primary object of the present invention to provide a representation of aircraft velocity utilizing signals which are available in DME systems.

SUMMARY OF THE INVENTION

The present invention is grounded on the proposition that ground speed may be evaluated based on the passage of the aircraft over known distance increments over fixed time intervals. Since the DME unit continuously is evaluating distance from the aircraft to the ground station, logic may be provided to determine changes of distance. Further, appropriate clocking allows for conversion of the distance increments directly to meaningful velocity representations.

In accordance with the principles of the present invention, pulses are produced which represent passage of the aircraft over one-tenth mile increments. Each such pulse is coupled to one terminal of an integrator-comparator, which produces the control voltage for a voltage controlled oscillator (VCO). The VCO output is frequency divided and fed back to the other terminal of the integrator-comparator, such that the control voltage to the VCO is successively altered in order to bring a balance between the divided VCO output pulses and the incoming distance change pulses. As the rate of distance pulses increases or decreases, the VCO output rate changes correspondingly. In order to obtain a meaningful representation of velocity, the VCO pulses are scaled by an appropriate factor, and are utilized to energize a counter which is read at a fixed periodicity. Accordingly, the number of counting increments during the fixed period may be made directly to correspond to velocity, by varying the scaling rate and the strobing of the counter.

DESCRIPTION OF THE DRAWING

The attached drawing sets forth an illustrative embodiment of the present invention in schematic form.

DETAILED DESCRIPTION

As set forth hereinbefore, the present invention is directed to provision of aircraft ground speed in DME systems, based on a digital representation of distance. It will be apparent that many such systems are known and commercially available, to each of which the present invention may be advantageously appended. Correspondingly, slight formatting revision may be required to adapt the embodiment set forth to the various DME systems. An example of one DME system to which the present invention has been applied with success is set forth in a publication entitled "Narco Avionics DME 190 Distance Measuring Equipment Maintenance Manual", which is available from Narco Avionics, a division of the assignee hereof, Fort Washington, Pennsylvania. In fact, that same manual sets forth a detailed logic schematic of the embodiment shown in the figure hereof. Hence, while the instant disclosure is directed to the level of disclosure customarily used and advantageously understood by those of ordinary skill in the art, said manual is hereby incorporated by reference herein for purposes of disclosure, should a more detailed schematic rendition be desired.

In the figure, there is shown a source of distance passage pulses 101, the precise embodiment of which will vary, depending upon the DME system with which the present invention is utilized. The purpose of source 101 is to provide a pulse each time the aircraft is shown by the DME to have passed through successive distance increments. In the above captioned Narco DME 190 manual, a degree of precision of one-tenth mile distance from aircraft to station is utilized, such that a pulse passses from the source 101 to a multivibrator 102 each time there is a one-tenth mile change in distance between the aircraft and the ground station. Further other timing and frequency division elements set forth in the figure are premised on distance pulses being delivered corresponding to one-tenth mile distance increments.

The embodiment set forth in the figure involves a velocity control loop in which a voltage controlled oscillator (VCO) 108 produces output pulses at a frequency which is made to correspond to velocity of the aircraft. Voltage controlled oscillators such as the one set forth at 108 produce a signal (in this case a binary pulse signal) having a frequency which is dependent on the voltage presented at its input terminal. In the embodiment shown, the voltage at the input terminal depends on receipt of distance passage pulses from 101, and a frequency divided version of the VCO signal which is fed back to another multivibrator 103. In a preferred embodiment, the oscillator 108 involves a sensitivity of approximately 700 pulses per second per input volt, and the VCO output involves a scale of 11.4 Hz per nautical mile per hour. In the feedback circuitry, pulses from oscillator 108 are divided at 109 by a factor of 4096, and coupled to a one shot multivibrator 103. The one shot multivibrators 102 and 103 each serve the function of providing pulses of uniform amplitude and duration for the respective signal paths, thereby permitting accurate integration and comparison of the frequency differences therebetween. In a preferred embodiment, each of the multivibrators 102 and 103 produce a pulse of approximately three-tenths of a second duration and a five volt amplitude each time a pulse is received at their respective terminals.

Pulses from the distance input multivibrator 102 and the velocity feedback multivibrator 103 are respectively coupled to opposite input terminals of an integrating comparator 104, which determines the average frequency disparity between the respective input signals, and translates that disparity into a voltage. Accordingly, the integrating comparator 104 preferably is embodied as an operational amplifier 128, a feedback capacitor 106, and appropriate biasing circuitry, not shown. The output of the integrating comparator 104 therefore increases or decreases, depending whether more input pulses occur from the distance passage multivibrator 102, or from the divided VCO output via multivibrator 103. A low pass filter 107 couples the output voltage from integrating comparator 104 to the VCO 108, and thereby the output frequency of the VCO is altered depending on relative occurance of pulses from multivibrators 102 and 103. In other words, if the number of one-tenth mile changes becomes greater or less than the divided VCO signal, the comparison integrator output will increase or decrease, depending on which multivibrator 102 or 103 fires more often. The sense of the integrator 104 is such as to cause the frequency of the output signal from the VCO 108 to increase or decrease until the VCO feedback multivibrator 103 is firing the same number of times as is the distance passage multivibrator 102. The overall circuit thus far described in therefore an oscillator whose frequency is controlled by a correction voltage obtained through a feedback loop.

Since the output signal from the VCO 108 represents the passage of the aircraft over specified distance intervals, when properly scaled it provides a direct representation of velocity. Accordingly, the output signal from the VCO 108 is divided by a factor of 16 at 110, the pulses from which are coupled to a counter 111. The counter 111 commences counting the pulses from frequency divider 110 when an energizing pulse is received at enabling terminal 115, and terminates counting each time a disabling pulse is received at 116. Hence, regulation of the enabling and disabling pulses to counter 11 via terminals 115 and 116 controls the extent to which counter 111 may progress under clocking by the VCO output divided by 16 at 110. In accordance with the various factors and specifications set forth hereinbefore, a 1.4 second counting duration for counter 111 produces a binary coded decimal (BCD) equivalent of the velocity in nautical miles per hour.

Each pulse which closes the input gates to counter 111 also strobes a parallel group of latches 112, thereby coupling the 1.4 second count from the counter 111 to a binary to seven segment decoder 113. In turn, the decimal velocity is displayed at 114 in nautical miles per hour. Immediately after the count from 111 is coupled to the decoder 113, the counter 111 is reset and the input gate is opened by means of a pulse at 115.

Timing for the gate open and gate close pulse for counter 111 is dependent on the units of measurement and degree of precision desired, and will vary correspondingly as the other parameters in the system are also varied. Likewise, it will be apparent that those skilled in the art may alter the frequency scaling at 109 and 110, as well as the specification of the multivibrators 102 and 103 and the sensitivity of comparator 104, filter 107, and oscillator 108, to achieve other desired results.

The velocity display is updated every 1.4 seconds by repeating the cycle of gating counting, and latching. For example, if the aircraft is travelling at 100 miles per hour, the average one-tenth mile change occurs at 3.6 second intervals. Since the output from the voltage controlled oscillator 108 is divided by a factor of 4096, the VCO output during a 3.6 second period is 4096 pulses, or 1137.8 pulses per second. The 1137.8 pulses per second signal, when divided by 16 at 110, results in a counted down rate of 71.11 pulses per second. This rate of pulses is counted for approximately 1.4 seconds; 100 counts will enter the counter 111 during this period, and when the counts are latched and decoded, the display 114 will indicate 100, the rate of speed of the aircraft with reference to the ground station.

An additional feature set forth in the figure is embodied by provision for a flip flop 118, the "not true" or $\overline{Q}$ output terminal of which operates an inhibit terminal to the one shot multivibrator 103. The function of flip flop 118 is temporarily to freeze the operation of the feedback loop under circumstances in which other apparatus in the DME determines that distance passage pulses either are unreliable, or are not being obtained at all. For example, if the operator of the DME is changing the frequency operation, or if there is a total loss of signals from the ground station, it is desirable to stop the loop at that point, effectively retain the present velocity "in memory" and wait until normal operation is reestablished. The flip flop 118 in conjunction with the one shot multivibrator 103 accomplishes this result for DME systems such as the Narco DME 190 described in the above captioned manual. In that system, loss of signal and other situations in which data actually is lost cause a "bar signal" to be displayed to the operator, rather than digits, and provide a situation in which the VCO loop should be frozen. Otherwise, the VCO 108 will be driven only be feedback path since no valid pulses are delivered from the source 101.

However, the Narco DME 190 system is capable of multiple function operation, either in distance, velocity, or time to station modes, and a function change also temporarily energizes the bar signal. The function change does not indicate that data has been lost, however, and therefore should not be allowed to freeze the VCO 108.

The various input and output connections to the flip flop 118 account for the above constraints. A control signal from the distance change decoder logic is coupled to an inhibit terminal 121 of flip flop 118, such that the flip flop 118 is inoperative so long as valid distance pulses are being produced. If they are not, a logical 0 is coupled to the inhibit terminal 121, and the flip flop is clocked at its input terminals 119 and 120. Presence of a bar display signal, appropriately inverted, is coupled to the "C" input 120, and thereby energizes the $\overline{Q}$ output terminal to a logic 1 unless a function change was the cause of the bar display, in which condition the "D" input 11$\underline{9}$ of flip flop 118 is energized, thereby reinstating the $\overline{Q}$ output terminal to a logic 0. Whenever the $\overline{Q}$ output terminal of flip flop 118 is a logical 1, the one shot multivibrator 103 in the feedback loop from voltage controlled oscillator 108 is inhibited from operating.

In summary, the embodiment set forth utilizes a voltage controlled oscillator having a divided feedback loop providing correction for received distance passage pulses. The oscillator output is appropriately scaled and read into a counter, which is utilized in timed fashion to activate a velocity display.

It is to be understood that the foregoing embodiment is presented as illustrative of the principles of the present invention, and that numerous alternatives will occur to those of ordinary skill in the art without departure from the spirit or the scope hereof.

We claim:

1. In a digital DME system, apparatus for developing ground speed of a aircraft comprising:
   a source of pulses respectively representing passage of the aircraft through successive fractional mile distance intervals;
   a voltage controlled oscillator;
   first means for frequency scaling an output signal from said oscillator by a first predetermined factor;

comparator means for developing a control signal variable in amplitude and sesnse in correspondence with the frequency difference between said pulses and the frequency scaled oscillator output signal, the amplitude of said developed control signal controlling the frequency of said oscillator; and means for counting the pulses from said oscillator during a fixed, specified period related to said intervals, to said factor, and to the amplitude-frequency difference sensitivity of said comparator means, thereby producing a representation of velocity.

2. The digital DME system as described in claim 1 wherein said comparator means comprises integrator means for producing a signal representative of said frequency difference, and low pass filter means for coupling said signal to said oscillator.

3. The digital DME system as described in claim 2 wherein said integrator means comprises:

an operational amplifier having a first input terminal connected to said source of pulses and a second input terminal connected to said first means;

and a capacitor connected in feedback relationship with said amplifier, an output of said amplifier being coupled to said filter means.

4. The digital DME system as described in claim 1 and further including:

means for dividing the pulses from said oscillator by a second predetermined factor and then coupling them to said means for counting; and means, energized after each said specified period, for converting the number of counted pulses into a representation of aircraft velocity.

5. The digital DME system as described in claim 4 wherein said first predetermined factor is 4096, said second predetermined factor is 16, and specified period is 1.4 seconds.

6. The digital DME system of claim 1 wherein said source of pulses comprises means for producing a pulse of predetermined amplitude and duration for each 0.1 mile change of distance of said aircraft relative to a DME ground station.

7. In a digital DME system, a method of developing a representation of aircraft velocity comprising the steps of:

providing a pulse signal having a frequency dependent on a control voltage;

dividing said pulse signal by a predetermined frequency factor;

producing distance pulses respectively representative of passage of the aircraft through successive distance intervals of at most 0.2 miles each;

developing said control voltage in response to frequency disparity between the divided pulse signal and the distance pulses, said voltage varying in amplitude and sense in response to said disparity; and counting the number of pulses in said signal during a predetermined time interval related to said distance intervals and to the sensitivity of said control voltage relative to said frequency disparity, thereby producing a representation of velocity.

8. A method as described in claim 7 wherein said counting step includes the steps of:

dividing the said pulse signal by a second predetermined factor;

counting at a fixed specified periodicity, the pulses divided by said second factor; and converting the pulses counted during each said specified period to a representation of velocity.

9. A method as described in claim 8 wherein said first factor is 4096, said second factor is 16, and said specified period is 1.4 seconds.

10. In a digital DME system, apparatus for developing ground speed of a aircraft comprising:

a source of pulses respectively representing passage of the aircraft through successive distance intervals;

a voltage controlled oscillator;

first means for frequency scaling an output signal from said oscillator by a first predetermined factor;

comparator means for developing a control signal corresponding to the frequency difference between said pulses and the frequency scaled oscillator output signal, said developed control signal controlling the frequency of said oscillator;

means for counting the pulses from said oscillator during a specified period, thereby producing a representation of velocity;

wherein said comparator means comprises integrator means for producing a signal representative of said frequency difference, and low pass filter means for coupling said signal to said oscillator;

wherein said integrator means comprises:

i. an operational amplifier having a first input terminal connected to said source of pulses and a second input terminal connected to said first means;

ii. and a capacitor connected in feedback relationship with said amplifier, an output of said amplifier being coupled to said filter means; and furher including first and second multivibrator mens respectively time scaling the amplitude and duration of respective signals from said first means and from said source of signals to be equivalent relative to each other.

11. In a digital DME system, apparatus for developing ground speed of a aircraft comprising:

a source of pulses respectively representing passage of the aircraft through successive distance intervals;

a voltage controlled oscillator;

first means for frequency scaling an output signal from said oscillator by a first predetermined factor;

comparator means for developing a control signal corresponding to the frequency difference between said pulses and the frequency scaled oscillator output signal, said developed control signal controlling the frequency of said oscillator;

means for counting the pulses from said oscillator during a specified period, thereby producing a representation of velocity; and memory means, operatively intermediate said first means and said comparator means, for inhibiting further change in the frequency of said oscillator for a predetermined time duration.

* * * * *